Nov. 14, 1967  J. BAUDE  3,353,012
TRANSISTORIZED MULTIPLICATION CIRCUIT
Filed Oct. 1, 1963  2 Sheets-Sheet 1

Inventor
John Baude
By R J Falkowski
Attorney

United States Patent Office 3,353,012
Patented Nov. 14, 1967

3,353,012
TRANSISTORIZED MULTIPLICATION CIRCUIT
John Baude, Milwaukee, Wis., assignor to Allis-Chalmers
Manufacturing Company, Milwaukee, Wis.
Filed Oct. 1, 1963, Ser. No. 313,116
11 Claims. (Cl. 235—194)

This invention relates to electronic multiplication circuits, particularly to transistor multiplication circuits that produce an output proportional to two inputs.

There are devices available for determing the product of inputs electrically. Among these are devices that apply one input voltage across a potentiometer and rotate a potentiometer through a desired angle of rotation (or distance along the potentiometer) to apply the other input. The output from the tap of the potentiometer is proportional to the voltage times the angle of rotation of the potentiometer.

This type of circuitry and its variations have various disadvantages. For example, a series of potentiometers connected in series to multiply several quantities does not produce an accurate output because of the resulting loading characteristics. As more potentiometers are required the initial power source is overloaded and the current is reduced through each circuit. The proportional voltages resulting are therefore inaccurate because of the varying current. Also, rotation of the potentiometers is required. This is usually accomplished with motors linked to the potentiometer and therefore requires a significant amount of time to accomplish. This makes this type of multiplication circuit relatively slow.

A device using the Hall effect is another device used to multiply two electrical quantities. These devices are also relatively slow and are not as easily adaptable as a device according to this invention.

A circuit according to this invention eliminates these disadvantages by utilizing transistorized circuits that produce an output proportonal to two inputs or a series of inputs instantaneously to perform a multiplication or division function. Because of its simplicity and instantaneous response this invention can also be applied in wattmeters, static relay controls, or other similar devices.

The objects of this invention are to provide a new and improved multiplication circuit; to provide a new and improved transistor multiplication circuit; to provide a transistor multiplication circuit capable of rapidly producing an output proportional to two or more inputs; to provide a multiplication circuit operable with either alternating current or direct current inputs; to provide a multiplication circuit that can operate as a wattmeter for alternating current, a static relay control circuit, or other similar device; and to provide a multiplication and division circuit that indicates the proper sign (polarity) resulting from multiplication or division.

These and other objects and advantages will become apparent from the following detailed description of this invention.

Figure 1:
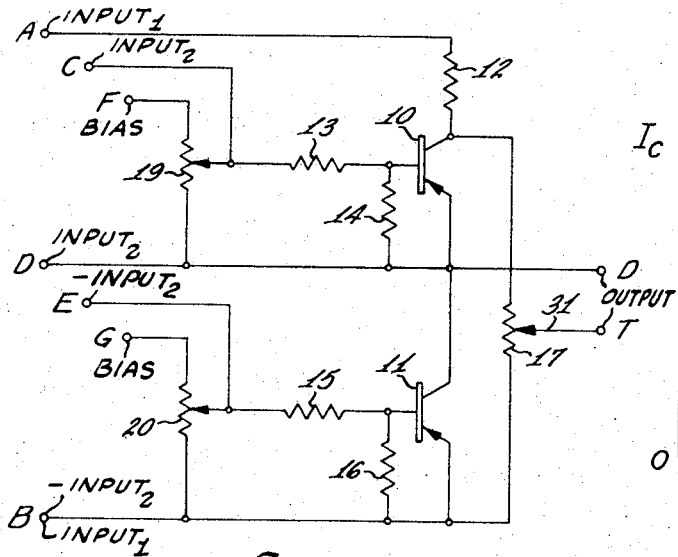
FIG. 1 is a schematic drawing of an embodiment of this invention utilizing direct current inputs.

Referring to FIG. 1, two transistors 10 and 11 have their output circuits, in this embodiment their emitter-collector circuits, connected in series. A collector resistor 12 is connected in series with the transistor output circuit to form a series output circuit consisting of resistor 12 and the output circuits of the transistor. Base and stabilizing resistors 13 and 14 are connected to the base of transistor 10, and base and stabilizing resistors 15 and 16 are connected to the base of transistor 11. An output resistance bridge, or potentiometer 17, having a tap 31 which provides a potential point T, is connected in parallel with the series connected transistor output circuits.

A means for biasing the transistors is provided by appropriate voltages applied across points FD and GB. The biasing levels of transistors 10 and 11 are controlled by adjustment of potentiometers 19 and 20, respectively.

A first input is applied across terminals AB. This input appears as a voltage, proportionally reduced by resistor 12, across the series connected transistor output circuit and parallelly connected potentiometer 17.

A second input is applied across the terminals CD and EB equally but in opposite directions, i.e., with opposite polarity relative to the transistors. By applying the second input in opposite directions to each other relative to the bases of the transistors, one of the transistors becomes more conductive while the other becomes less conductive as a function of, or depending on design characteristics, in direct proportion to the second input voltage.

The transistors are balanced to have equal conductance when the second input is zero by the adjustment of potentiometers 19 and 20. Potentiometer 17 is adjusted so that when a voltage is present across AB and the second input is zero, point T is at the same potential as point D. Point D functions as a potential point in the series output circuit between the transistors.

Depending on the voltage and polarity of application of the second input, point D proportionately moves toward the potential of either terminal A or B, and away from the potential of point T in proportion to the ratio of conductances of the two transistors.

The first input voltage across points AB determines the amount of potential change of point T relative to point D as effected by the ratio of conductances of the transistors as determined by the second input. Therefore, the voltage across DT varies as a function of the first input across points AB and the second input across points CD and EB.

It is also possible to obtain similar results by applying the second input to only one transistor base and keeping the conductance of the second transistor constant. In this type of circuit the second transistor can be replaced by a resistance. The resulting output is not as clearly defined and therefore not as accurate, as with the described embodiment.

By selecting the polarities of the input voltages, the circuit also indicates the sign of the product. If a votlage is applied as postive from A to B and positive from C to D (at the same time negative from E to B), the resultant output across DT is of one polarity, for example, positive from T to D. If the polarity of the input at A and B is reversed, the polarity of the output at TD is similarly reversed (to negative). The same is true if the polarity of the voltages are reversed at CD and EB only. If both inputs are reversed, the output is again positive from T to D.

Figure 4:
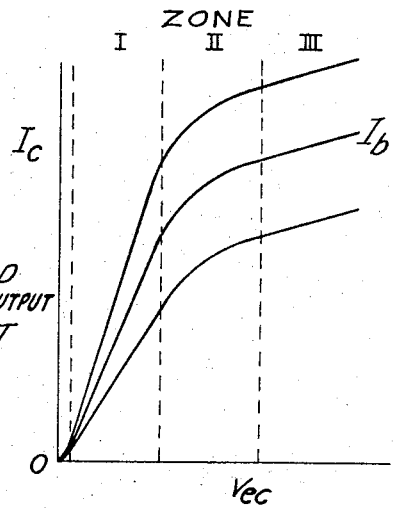
FIG. 4 is a graphical drawing of a characteristic curve family of a transistor that can be used with this invention.

For optimum performance, the transistors are operated in saturation over a range that assures linear performance. Referring to FIG. 4, a characteristic curve family of a transistor that could be used is shown. The transistors are operated in the linear portion of the saturated region, indicated as zone I in FIG. 4, by applying appropriate biases to the bases by adjustment of potentiometers 19 and 20 and by proper selection of resistor 12 to limit the collector-emitter voltage. The range of voltages applied as inputs are limited to assure linear operation of the transistors by limiting the maximum input voltages to prevent unsaturated operation and by limiting the minimum second input voltage (or maintaining some forward bias) to prevent operation in the nonlinear region occur-

3 ring when the collector-emitter voltage is close to zero (FIG. 4).

The transistors could be operated in the linear non-saturated region (zone III in FIG. 4) but would not provide the advantages of better defined voltage levels and low heat dissipation requirements.

Figure 2:
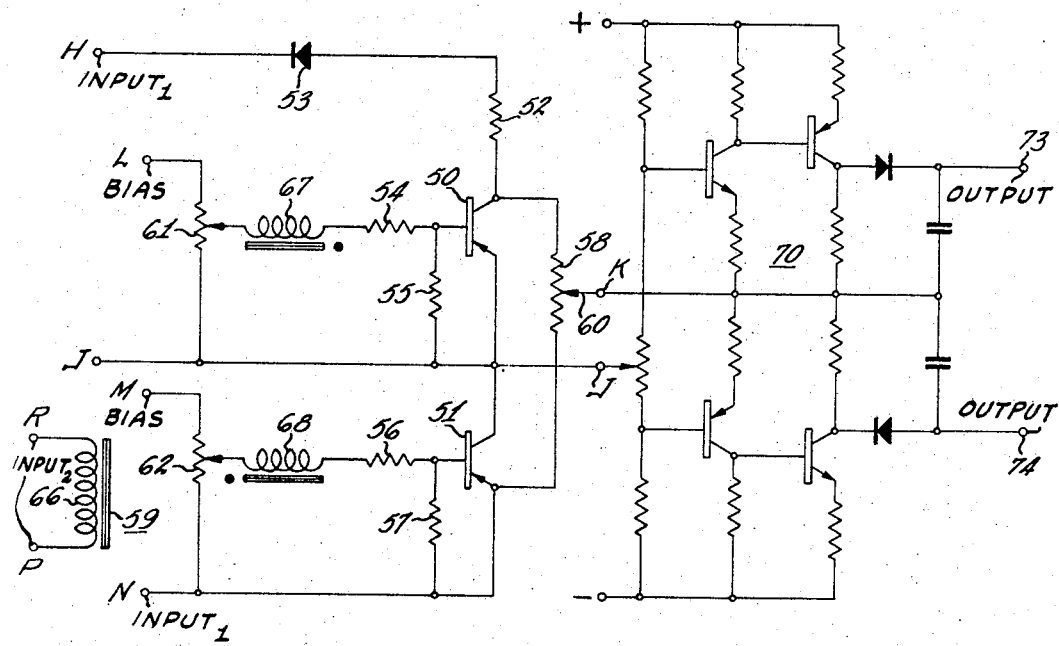
FIG. 2 is a schematic drawing of another embodiment of this invention utilizing alternating current inputs.

FIG. 2 shows a multiplication circuit according to this invention that utilizes AC inputs to produce a unidirectional alternating output varying in proportion to the voltages of the inputs. The circuit is similar to that shown in FIG. 1, and comprises transistors 50 and 51 connected with their output circuits in series and a collector resistor 52 and a diode 53 in series with the transistor output circuits. Base and stabilizing resistors 54 and 55 are connected to the base of transistor 50 and base and stabilizing resistors 56 and 57 are connected to the base of transistor 51. A potentiometer 58, with a tap 60 furnishing a potential point K, is connected across (in parallel with) the output circuits of the transistors. Biasing potentiometers 61 and 62 are connected to the bases of transistors 50 and 51, respectively, for adjusting the biases applied, as described with the embodiment of FIG. 1, to the bases of their respective transistors across terminals LJ and MN, respectively.

A transformer 59 has terimnals R and P across a primary winding 66 and two secondary windings 67 and 68 connected in the biasing circuit of transistors 50 and 51, respectively. The secondary windings are wound in opposite directions so that a potential appearing across primary winding 66 will produce equal outputs of opposite polarity (180° out of phase) in the two secondary windings 67 and 68.

An amplifier 70 is connected to receive the output of the multiplication circuit at terminals KJ and produce an amplified output across terminals 73 and 74. Amplifier 70 is a typical class B amplifier, known in the art, selected for its linear response.

In the operation of the circuit of FIG. 2, the first input is applied across terminals HN and a measure of the voltage, proportionally reduced by resistor 52, appears across the series connected output circuits of the transistors and across parallelly connected potentiometer 58. The first input is rectified by diode 53.

The second input voltage is applied across terminals RP of primary winding 66 and appears in opposite directions (180° out of phase) in the secondary windings 67 and 68 to cyclically increase the conductance of one transistor and decrease the conductance of the other transistor in proportion to the second input voltage. Therefore, the circuit operates similarly to that of FIG. 1 and produces a unidirectional cyclic output across potentiometer 58 and the transistor output circuits proportional to the first input voltage and produces a unidirectional cyclic output across terminals KJ proportional to the two input voltages.

The output appearing across terminals KJ in FIG. 2 is unidirectional because the emitter-collector current flows only in one direction. A modification of this circuitry that uses both half cycles of the input voltages is shown in FIG. 3.

Figure 3:
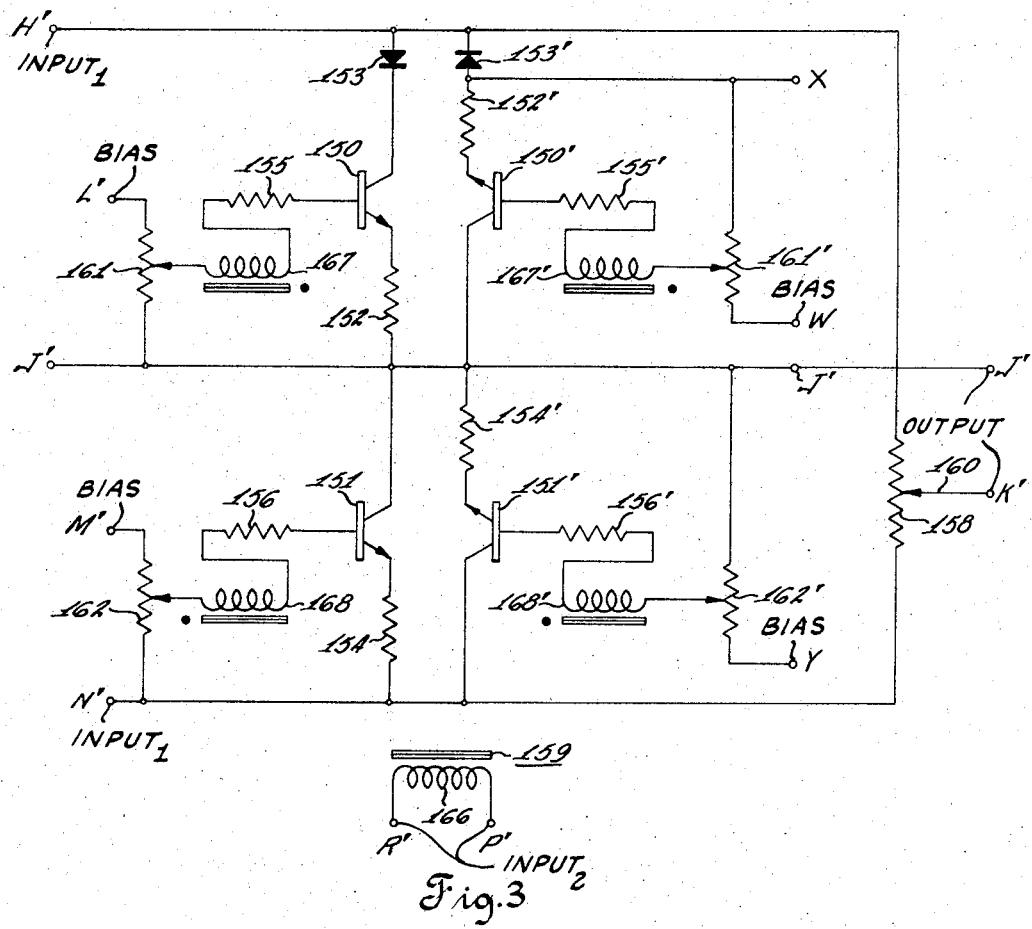
FIG. 3 is a schematic drawing of another embodiment of this invention using alternating current inputs.

Referring to FIG. 3, a circuit similar to the circuit of FIG. 2 comprises a pair of transistors 150 and 151, having their output circuits connected in series with a diode 153 and resistors 152 and 154. Resistors 155 and 156 are base resistors for transistors 150 and 151, respectively. Another pair of transistors 150' and 151' are similarly connected in series with a diode 153' and resistors 152' and 154'. Resistors 155' and 156' are base resistors for transistors 150' and 151', respectively. These two series circuits are connected in parallel across first input terminal H'N'.

Biasing currents for transistors 150, 151, 150' and 151' are supplied across terminals L'J', M'N', and WX and J'Y, respectively, and the biasing is adjusted by potentiometers 161, 162, 161' and 162', respectively.

4

Both pairs of transistors and their associated series connected components are connected across the first input terminals H'N' and each pair conducts in a direction opposite to the other so that the full cycle of the alternating current input, the first input at H'N', is used.

The second input is applied across terminals R'P' of a primary winding 166 of a transformer 159. The second input appears in four secondary windings, 167, 168, 167' and 168'. The transistors are cyclically biased in the same manner as in the embodiment of FIG. 2 to proportionally increase the conductance of one transistor and decrease the conductance of the other in each series connected transistor output circuit during respective half cycles.

When the first input is applied across terminals H'N', current flows through the emitter-collector circuits of transistors 150 and 151 during one half cycle and through the emitter-collector circuits of transistors 150' and 151' during the other half cycle. The first input voltage appears across the transistor series circuits and across the parallelly connected potentiometer 158. Potentiometer 158 has a tap 160 for furnishing a potential point K'. The voltage appearing across terminals J'K' is proportional to the first input voltage at H'N' and the second input at R'P'.

The circuits shown in FIGS. 2 and 3 can be advantageously used as wattmeters. To determine the effective power output, a voltage signal proportional to the voltage of a power system is applied as one input and a voltage signal proportional to the current through the power system is applied as a second input. The output that appears across terminals KJ is proportional to the instantaneous current times the instantaneous voltage. The resultant output furnishes a direct reading of the power output with automatic correction for the phase shift between current and voltage. Therefore, no phase shift calculation or correction is necessary.

In describing the invention, the preferred embodiment has been shown and described but it is obvious to one skilled in the art that there are many variations, combinations and alterations that may be made without departing from the spirit and scope of the invention.

The embodiments of the invention for which an exclusive property or privilege is claimed are defined as follows:

1. An electrical multiplication circuit for producing an output proportional to a first and second input comprising:
   a transistor connected to operate in a linear portion of its characteristic curve having an input circuit connected to receive the second input and having an output circuit;
   a resistance connected in series with the transistor output circuit to form a series circuit,
   said series circuit connected to receive the first input across the series circuit; and
   a potentiometer connected in parallel with the series circuit, said potentiometer having a tap, said tap adjusted so that the potential between said tap and a point in the series circuit between the resistance and the transistor output circuit is proportional to the first and second input.

2. A circuit according to claim 1 wherein said resistance is a second transistor operating at a predetermined substantially constant conductance.

3. A circuit according to claim 2 wherein said second transistor has an input circuit connected to receive the second input and wherein the second input is applied with opposite polarity to the input circuits of the two transistors to increase the conductance of one transistor as a function of the second input level and decrease the conductance of the other transistor as a function of the second input level.

4. An electrical multiplication circuit for producing an output proportional to a first input and a second input comprising:
   a transistor connected to operate in a linear portion of its characteristic curve having an input circuit connected to receive the second input and having an output circuit;

a resistance connected in series with the transistor output circuit to form a first output circuit; and a potentiometer connected in parallel with the first output circuit, said potentiometer having an adjustable tap adjusted to have the same potential as a point in the first output circuit between the resistance and the transistor output circuit when the second input is zero so that the output proportional to the first input and the second input appears across said tap and said point.

5. An electrical multiplication circuit for producing an output proportional to a first input and a second input comprising:

a first transistor and a second transistor having their output circuits connected in series to form a series circuit and to receive the first input across said series circuit, said transistor connected to operate in a linear portion of its characteristic curve;

means for applying the second input to the first transistor to vary the conductance of said first transistor in proportion to said second input;

and a potentiometer having a tap, said potentiometer connected across the series circuit so that the proportional output is produced between said tap and a point between said transistor output circuits in said series circuit.

6. A circuit according to claim 5 wherein said means for applying the second input to the first transistor also applies the second input to the second transistor to vary the conductance of the second transistor in proportion to said second input oppositely to the varying of conductance of said first transistor.

7. A circuit for producing an output voltage proportional to a first and second input voltage comprising:

a first transistor and a second transistor each having an input circuit and an output circuit connected in series with each other to receive a first input voltage across said series connected circuits, said first input voltage range selected to assure linear and saturated operation of the transistors;

means for biasing said transistors to assure linear and saturated operation, means for applying the second input voltage to the input circuits of the first and second transistor to vary the conductance in one direction for the first transistor in proportion to the first input voltage and in the opposite direction for the second transistor in proportion to the second input voltage;

a potentiometer having a tap, said potentiometer connected in parallel with the series circuit of the output circuits of the transistors; and an output means for providing the output voltage proportional to the first and second input voltages, said output means having a first terminal connected in the transistor output series circuit between the transistors and a second terminal connected to the potentiometer tap.

8. An electrical circuit for producing an output voltage proportional to a first input voltage and a second input voltage comprising:

a first transistor and a second transistor, said first transistor having its emitter connected to the collector of said second transistor;

means for applying the first input voltage across the collector of the first transistor and the emitter of the second transistor;

means for applying adjustable bias voltages across the base and emitter of the transistors;

means for applying the second input voltage to the bases of the transistors to increase the conductance of one transistor in proportion to said second input voltage and to decrease the conductance of the other transistor in proportion to said second input voltage; and a potentiometer having a tap, said potentiometer connected across the collector of the first transistor and the emitter of the second transistor, said output voltage appearing across the tap and the emitter of the first transistor.

9. An electrical multiplication circuit for producing an output proportional to a first input and a second input comprising:

a pair of first input terminals for receiving the first input;

a first transistor having an emitter and collector, said collector connected to one of said input terminals;

a second transistor having an emitter and collector, said collector connected to the emitter of the first transistor and said emitter connected to the other input terminal;

means for assuring saturated linear operation of the transistors over the range of voltages of the inputs;

means for applying the second input to vary the conductance of one of the transistors in proportion to said second input;

a potentiometer having a tap, said potentiometer connected between the collector of the first transistor and the emitter of the second transistor; and a pair of output terminals for providing the proportional output, one of said output terminals connected to said tap and the other output terminal connected to the emitter of said first transistor.

10. A circuit according to claim 9 wherein said means for applying the second input also varies the conductance of the other transistor in proportion to said second input in a direction opposite to the varying of said one transistor.

11. A circuit according to claim 9 wherein the means for assuring saturated linear operation of the transistor comprises:

a resistance connected in the emitter-collector series circuit of the transistors; and means for applying biasing voltage to the transistors.

References Cited

UNITED STATES PATENTS

| 3,152,250 | 10/1964 | Platzer | 235—194 X |
| 3,165,650 | 1/1965 | White | 328—160 X |
| 3,219,808 | 11/1965 | Lee | 324—142 X |

OTHER REFERENCES

Seegmiller, W. R., Accurate Analog Computation, In Electronics; March 30, 1962.

Schmid, H. A., Transistorized Four-Quadrant Time Division Multiplier With An Accuracy of 0.1 Per Cent. IRE Transactions On Electronic Computers vol. Ec7 March, 1958, pp. 41–51.

MALCOLM A. MORRISON, *Primary Examiner.*

I. KESCHNER, J. RUGGIERO, *Assistant Examiners.*